(12) United States Patent
Cheng

(10) Patent No.: US 6,847,421 B2
(45) Date of Patent: Jan. 25, 2005

(54) STRUCTURE OF COLOR FILTER PLATE

(75) Inventor: Hsin-An Cheng, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 91 days.

(21) Appl. No.: 10/277,300

(22) Filed: Oct. 22, 2002

(65) Prior Publication Data
US 2004/0075788 A1 Apr. 22, 2004

(51) Int. Cl.$^7$ ............................................. G02F 1/1333
(52) U.S. Cl. ...................................................... 349/106
(58) Field of Search .......................................... 349/106

(56) References Cited

U.S. PATENT DOCUMENTS

| | | | | |
|---|---|---|---|---|
| 5,144,288 A | * | 9/1992 | Hamada et al. | 349/109 |
| 5,437,896 A | * | 8/1995 | Kloosterboer et al. | 427/515 |
| 5,745,201 A | * | 4/1998 | Kawai et al. | 349/110 |
| 5,822,026 A | * | 10/1998 | Matsuo | 349/38 |
| 5,833,507 A | * | 11/1998 | Woodgate et al. | 445/24 |
| 6,069,674 A | * | 5/2000 | Aomori et al. | 349/12 |
| 6,624,860 B1 | * | 9/2003 | Narutaki et al. | 349/106 |

* cited by examiner

Primary Examiner—Robert H. Kim
Assistant Examiner—P. R. Akkapeddi
(74) Attorney, Agent, or Firm—Moser, Patterson & Sheridan, L.L.P.

(57) ABSTRACT

A structure of a color filter plate for a liquid crystal display panel is described. The structure includes a body having four truncated edges and two recessed portions. The four truncated edges are non-right-angled in shape and respectively formed at four vertexes of the body. The two recessed portions are respectively formed on two opposite sides of the body. When forming a color filter layer composed of plural color filter plates in delta arrangement, the overlapping area of three adjacent color filter plates can be lowered. The light leakage problem of the liquid crystal display panel is suppressed, and the picture quality and the contrast thereof are enhanced.

24 Claims, 8 Drawing Sheets

STRUCTURE OF COLOR FILTER PLATE

BACKGROUND OF THE INVENTION

1. Field of Invention

The present invention relates to a structure of a color filter plate. More particularly, the present invention relates to a structure of a color filter plate for a liquid crystal display panel, which can suppress a light leakage problem of the liquid crystal display panel and enhance the picture quality and the contrast thereof.

2. Description of Related Art

Liquid crystal display (LCD) has so many advantages, including high picture quality, small volume, light weight, low driving voltage and low power consumption, that LCDs are widely applied in electronic products such as medium or small-sized portable televisions, mobile phones, videos, notebooks, monitors for desktop computers and projection-type televisions.

At present, thin film transistor liquid crystal display (TFT LCD) is the most popular type of LCD. There are four main processes for producing TFT LCDs, i.e., thin film transistor array substrate process, color filter layer process, liquid crystal cell assembly process and liquid crystal module (LCM) process Reference is made to FIG. 1, which is a schematic cross-sectional view of one liquid crystal display panel manufactured in accordance with the prior art. A color filter layer 13 and a black matrix 14 are formed on the opposite substrate 12. The thin film transistor 15 is located on the thin film transistor array substrates 1. The black matrix 14 is disposed over the thin film transistor15.

Reference is made to FIG. 2, which is a schematic cross-sectional view of another liquid crystal display panel manufactured in accordance with the prior art. To save production cost, only a color filter layer 23, without further including a black matrix, is formed on the opposite substrate 22. In fact, the overlapping area 24 of the color filter plates 23 has the same function as a black matrix. However, as shown in FIGS. 3A and 3B, which respectively show a schematic top view of the color filter plates in delta arrangement in accordance with the prior art and a schematic cross-sectional view of region 34 in FIG. 3A, the three adjacent red, green and blue color filter plates 31, 32, 33 to compose a color filter layer 3 overlap at the region 34. Overlap of the adjacent red, green and blue color filter plates 31, 32, 33 results in forming a protrusion 341 in the region 34. When the voltage is applied for the liquid crystal display, the electronic field in the region 34 is stronger than that in other regions, resulting in a difference between the rotation degree of the liquid crystal molecule 38 in the region 34 and liquid crystal molecule 39 in other regions. Besides, the protrusion 341 makes the cell gap "d" in region 34 different from that in other regions. Hence, a light leakage problem of the liquid crystal display panel arises, and the picture quality and the contrast thereof are lowered.

For the forgoing reasons, there is a need to develop a novel color filter plate to solve the above problems. It is therefore an objective of the present invention to provide a color filter plate for a liquid crystal display panel. The color filter plate suppresses the light leakage problem of the liquid crystal display panel and enhances the picture quality and the contrast of the liquid crystal display panel.

In accordance with the foregoing and other objectives of the present invention, a structure of a color filter plate for a liquid crystal display panel is provided. The structure of the color filter plate includes a body having four truncated edges and two recessed portions. The four truncated edges are non-right-angled in shape and respectively formed at four vertexes of the body. The two recessed portions are respectively formed on two opposite sides of the body. When forming a color filter layer composed of plural color filter plates in delta arrangement, the overlapping area of three adjacent color filter plates are lowered to suppress light leakage problem of the liquid crystal display panel and enhance the picture quality and the contrast thereof.

According to one preferred embodiment of the present invention, the truncated edge is in the shape of an inclined plane or an arc.

According to another preferred embodiment of the present invention, the recessed portion is formed in the middle of the side of the body, and the recessed portion is in the shape of a rectangle, a triangle, a trapezoid or an arc.

As embodied and broadly described herein, the invention provides a novel color filter plate. While forming a color filter layer composed of plural color filter plates in delta arrangement, the overlapping area of three adjacent color filter plates are lowered to suppress light leakage problem of the liquid crystal display panel and enhance the picture quality and the contrast thereof.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
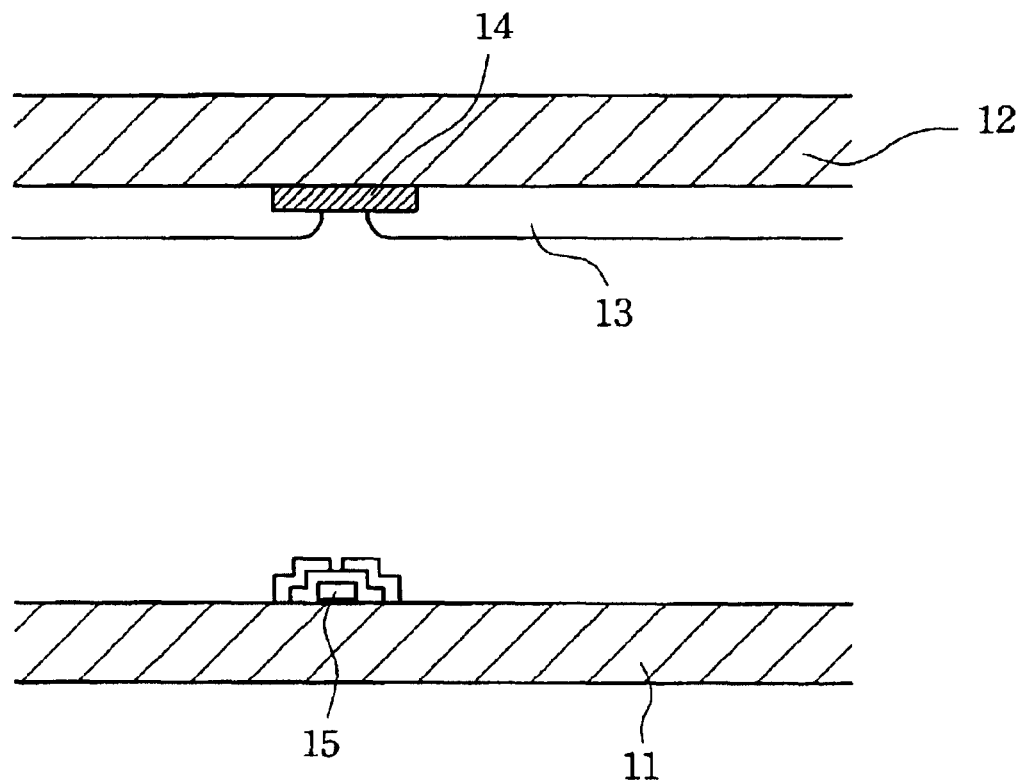
FIG. 1 is a schematic, cross-sectional view of one liquid crystal display panel manufactured in accordance with the prior art.
Figure 2:
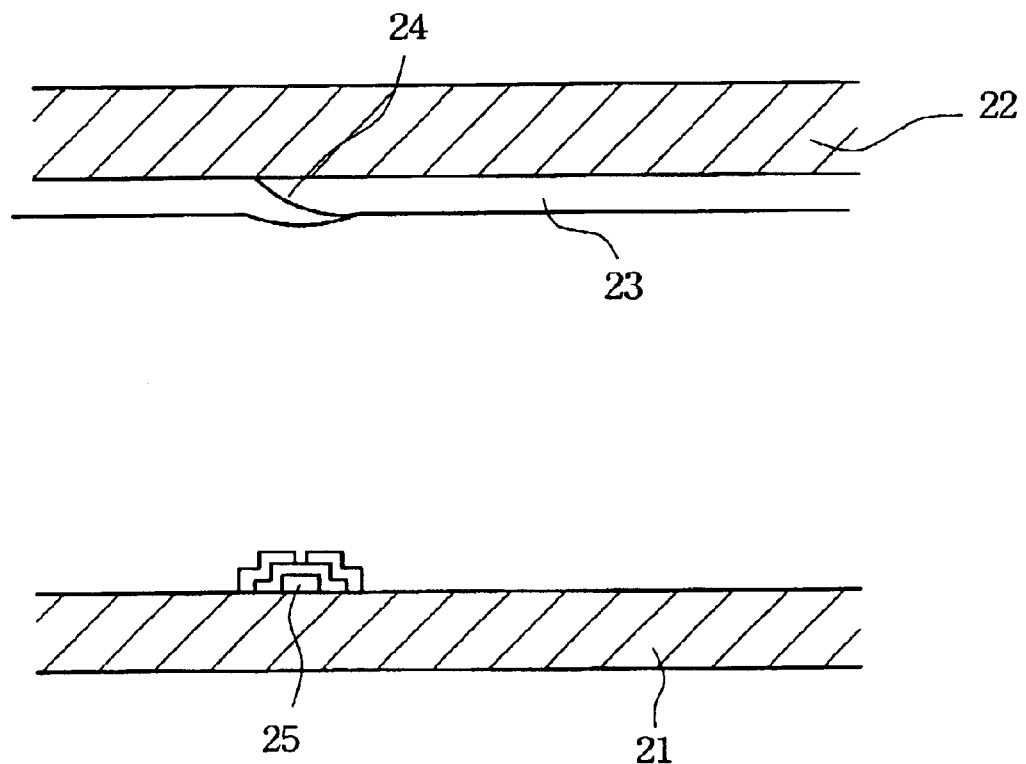
FIG. 2 is a schematic, cross-sectional view of another liquid crystal display panel manufactured in accordance with the prior art.
Figure 3A:
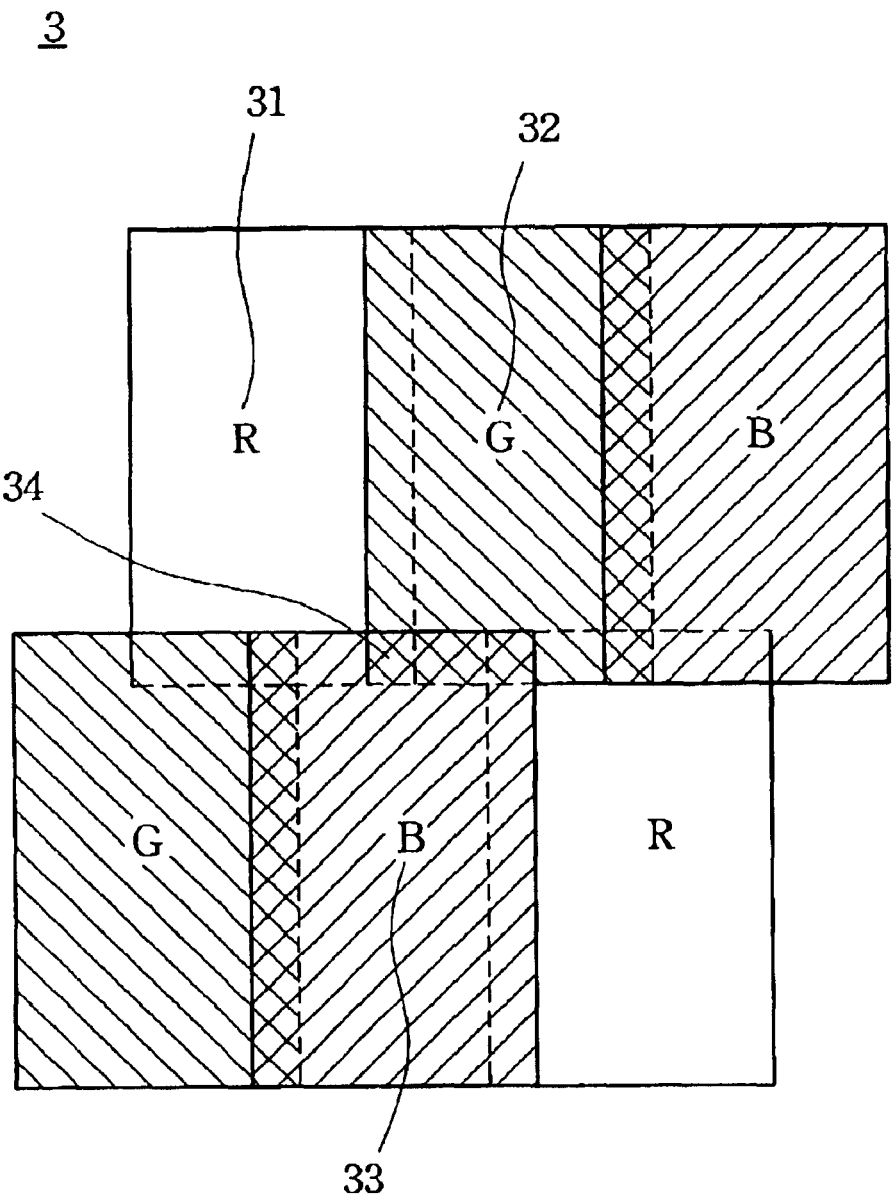
FIG. 3A is a schematic top view of the color filter plates in delta arrangement in accordance with the prior art.
Figure 3B:
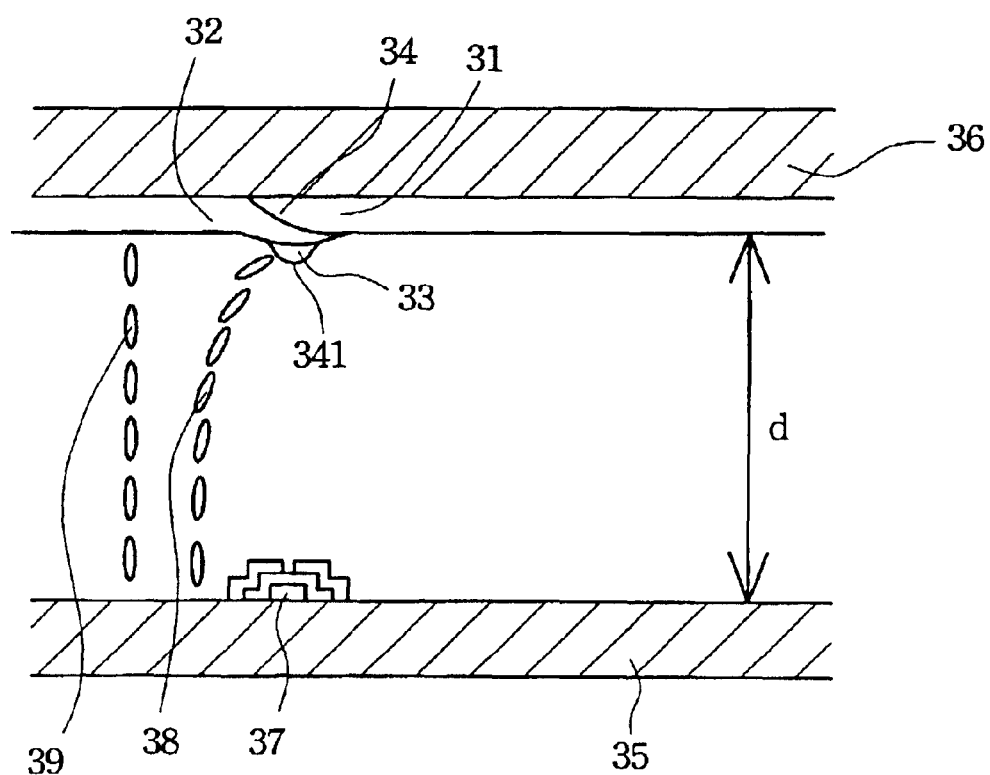
FIG. 3B is a schematic, cross-sectional view of region 34 in FIG. 3A.

Reference will now be made in detail to the present preferred embodiments of the invention, examples of which are illustrated in the accompanying drawings. Wherever possible, the same reference numbers are used in the drawings and the description to refer to the same or like parts.

Figure 4A:
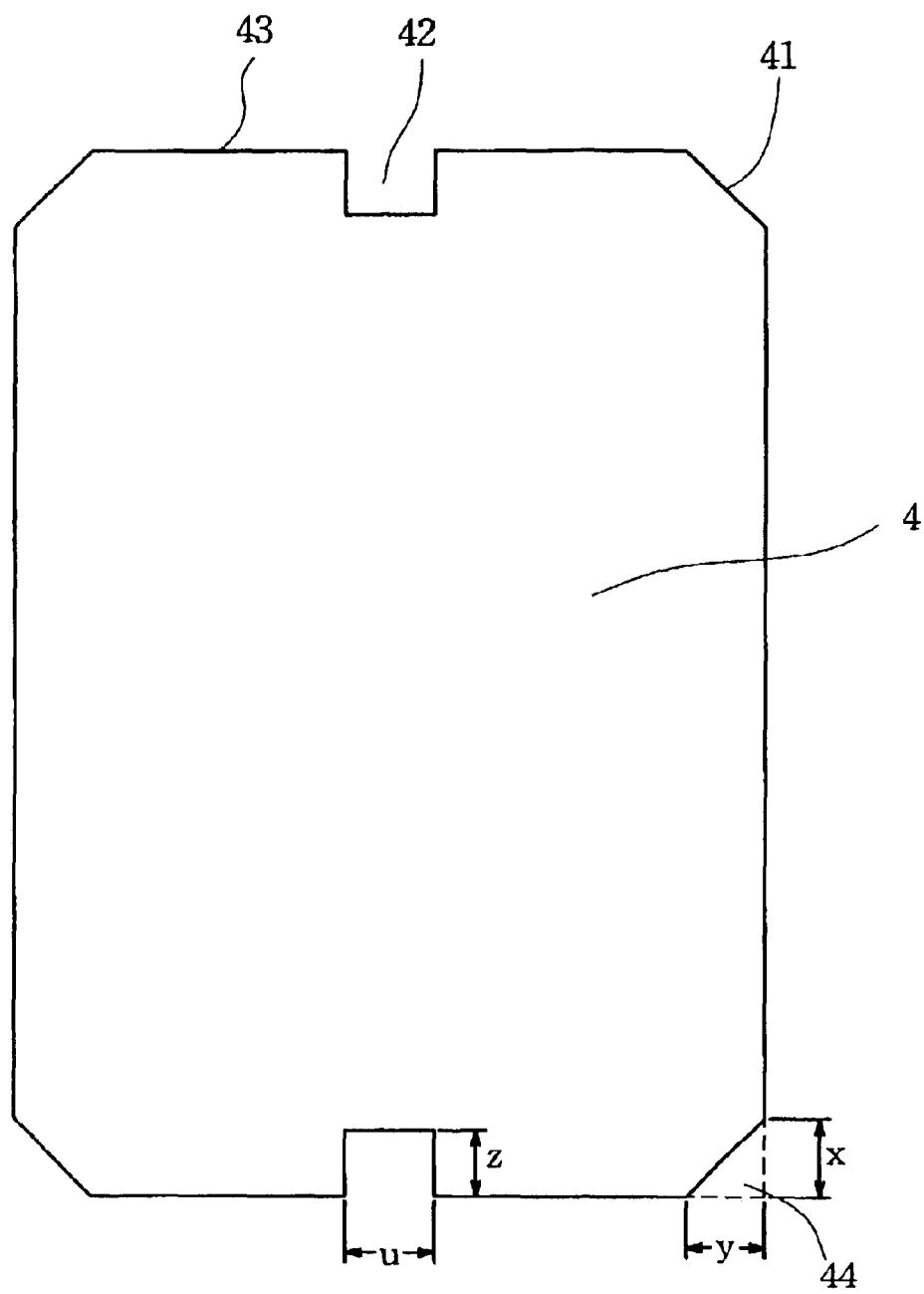
FIG. 4A is a schematic top view of a color filter plate according to the first preferred embodiment of the present invention.

FIG. 4A is a schematic top view of a color filter plate according to the first preferred embodiment of the present invention. The structure of a color filter for a liquid crystal display panel includes a body 4 having four truncated edges 41 and two recessed portions 42. The four truncated edges 41 are non-right-angled in shape, e.g. in the shape of an inclined plane, and respectively formed at four vertexes of the body 4. The two recessed portions 42 being both in the shape of rectangles are respectively formed on two opposite sides 43 of the body 4.

The truncated edge 41 formed at the vertex of the body 4 defines a truncation portion 44. Preferably, the length of the truncation portion 44 is in the range of $0<x<10$ μm, and the width of the truncation portion 44 is in the range of $0<y<10$ μm. In addition, preferably, the length of the recessed portion 42 is in the range of $0<z<10$ μm, and the width of the recessed portion 42 is in the range of $0<x<10$ μm.

In light of present technological design for the color filter plates to be in delta arrangement, the two recessed portions 42 are respectively formed on two opposite short sides of the body 4, and should be respectively formed in the middle of the two opposite short sides of the body 4 Certainly, in case of complying with the designed pattern of the thin film transistor array substrate, the two recessed portions could be also formed on two opposite long sides of the body 4, and should be respectively formed in the middle of the two opposite long sides of the body 4.

Figure 4B:
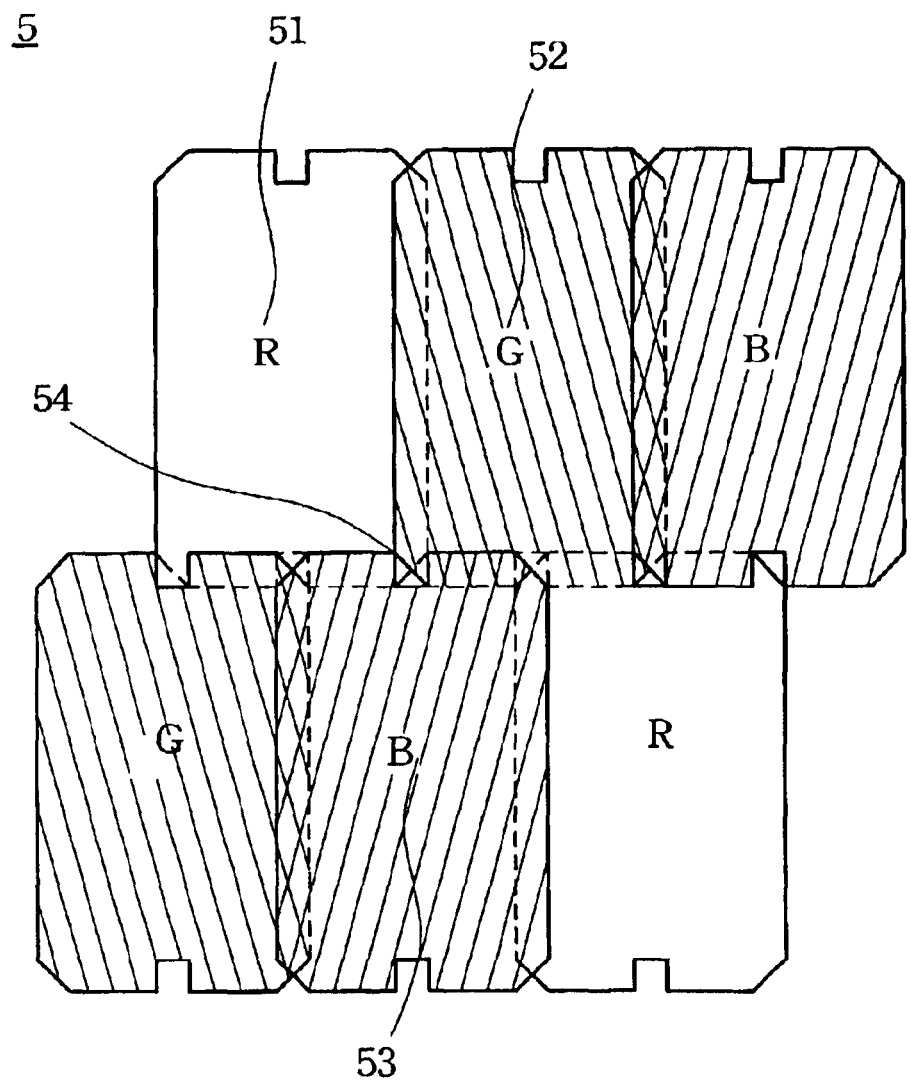
FIG. 4B is a schematic top view of the color filter plates in delta arrangement according to the first preferred embodiment of the present invention.

FIG. 4B is a schematic top view of the color filter plates in delta arrangement according to the first preferred embodiment of the present invention. When forming a color filter layer 5 composed of red, green and blue color filter plates 51, 52, 53, in delta arrangement, the overlapping area 54 of the three adjacent color filter plates is lowered. Even if misalignment occurs in the photolithography process while manufacturing the color filter layer 5, the overlapping area 64 of red, green and blue color filter plates 51, 52, 53, when compared with the prior arts, can still be lowered. It is therefore that the light leakage problem of the liquid crystal display panel can be suppressed, and the picture quality and the contrast thereof can be enhanced.

Figure 5A:
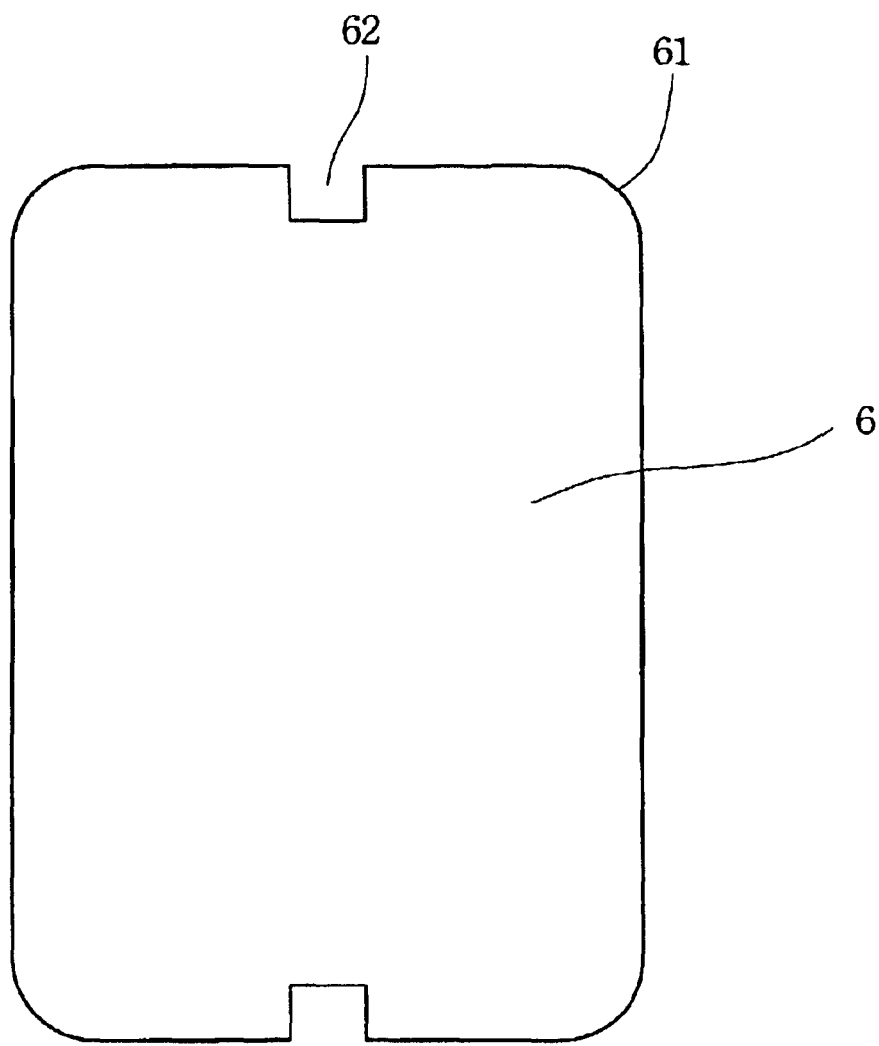
FIG. 5A is a schematic top view of a color filter plate according to the second preferred embodiment of the present invention.
Figure 5B:
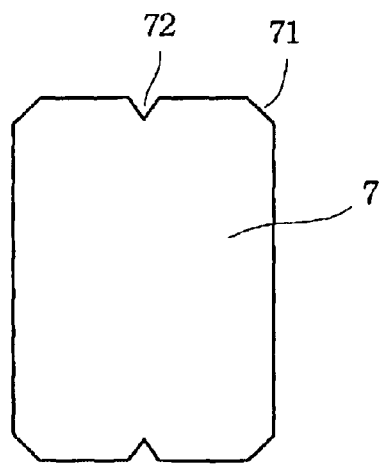
FIG. 5B is a schematic top view of a color filter plate according to the third preferred embodiment of the present invention.
Figure 5C:
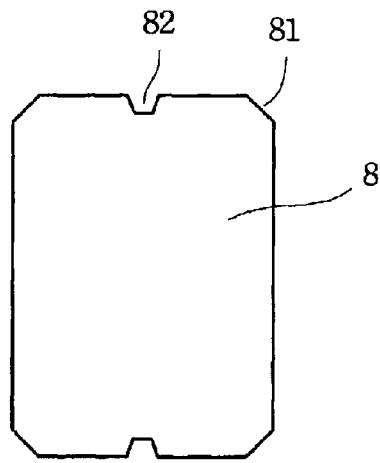
FIG. 5C is a schematic top view of a color filter plate according to the fourth preferred embodiment of the present invention.
Figure 5D:
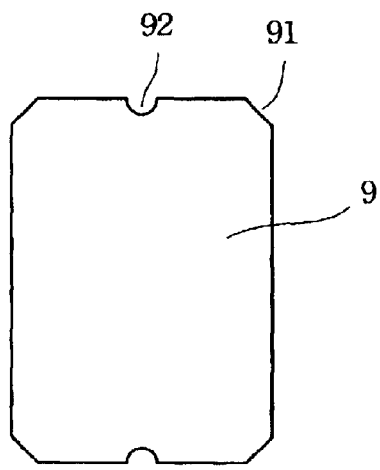
FIG. 5D is a schematic top view of a color filter plate according to the fifth preferred embodiment of the present invention.

Alternatively, the truncated edge being in the shape of an arc 61 (FIG. 5A), the recessed portion being in the shape of a triangle 72, a trapezoid 82 or an semicircle 92 (FIGS. 5B–5D), or other shapes capable of conspicuously lower the overlapping area of the three adjacent color filter plates can be adopted such that the light leakage problem of the liquid crystal display panel can be suppressed, and the picture quality and the contrast of the liquid crystal display panel can be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure of a color filter plate for a liquid crystal display panel, comprising a body having four truncated edges and two recessed portions, said four truncated edges being non-right-angled in shape and respectively formed at four vertexes of said body, said two recessed portions being respectively formed on two opposite sides of said body, so that while forming a color filter layer composed of plural said color filter plates in delta arrangement, a height of an overlapping area of adjacent color filter plates is lowered by said truncated edges and said recessed portions.

2. The structure according to claim 1, wherein said truncated edge is in a shape of an inclined plane.

3. The structure according to claim 1, wherein said truncated edge is in a shape of an arc.

4. The structure according to claim 1, wherein said body is in a shape of a rectangle.

5. The structure according to claim 4, wherein said two opposite sides of said body are two short sides of said body.

6. The structure according to claim 1, wherein said recessed portion is formed in a middle of said side.

7. The structure according to claim 1, wherein said recessed portion is in a shape of a rectangle.

8. The structure according to claim 1, wherein said recessed portion is in a shape of a triangle.

9. The structure according to claim 1, wherein said recessed portion is in a shape of a trapezoid.

10. The structure according to claim 1, wherein said recessed portion is in a shape of an arc.

11. The structure according to claim 1, wherein said truncated edge formed at the vertex of said body defines a truncation portion, and a length of said truncation portion is in a range of $0<x<10$ μm.

12. The structure according to claim 1, wherein said truncated edge formed at the vertex of said body defines a truncation portion, and a width of said truncation portion is in a range of $0<y<10$ μm.

13. The structure according to claim 1, wherein a length of said recessed portion is in a range of $0<z<10$ μm.

14. The structure according to claim 1, wherein a width of said recessed portion is in a range of $0<u<10$ μm.

15. The structure according to claim 1, wherein said color filter plate is a red color filter plate, a green color filter plate or a blue color filter plate.

16. A color filter layer for a liquid crystal display panel, comprising:
a plurality of color filter plates arranged in delta arrangement, each color filter plate comprising:
a body having four truncated edges and two recessed portions, said four truncated edges being in a shape of an inclined plane and respectively located at four vertexes of said body, said two recessed portions respectively formed in a middle of two opposite sides of said body, so that a height of an overlapping area of adjacent color filter plates is lowered by said truncated edges and said recessed portions.

17. The structure according to claim 16, wherein said body is in a shape of a rectangle.

18. The structure according to claim 16, wherein said two opposite sides of said body are two short sides of said body.

19. The structure according to claim 16, wherein said truncated edge formed at the vertex of said body defines a truncation portion, and a length of said truncation portion is in a range of $0<x<10$ μm.

20. The structure according to claim 16, wherein said truncated edge formed at the vertex of said body defines a truncation portion, and a width of said truncation portion is in a range of $0<y<10$ μm.

21. The structure according to claim 16, wherein a length of said recessed portion is in a range of $0<z<10$ μm.

22. The structure according to claim 16, wherein a width of said recessed portion is in a range of $0<u<10\ \mu m$.

23. The structure according to claim 16, wherein said two recessed portions is in a shape of a rectangle.

24. The structure according to claim 16, wherein said two recessed portions is in a shape of an arc.

* * * * *